United States Patent [19]

Shimomura

[11] Patent Number: 4,495,120
[45] Date of Patent: Jan. 22, 1985

[54] METHOD FOR MANUFACTURE OF SHAPED ARTICLE OF POLYURETHANE FOAM

[75] Inventor: Kenji Shimomura, Yokohama, Japan
[73] Assignee: Ikeda Bussan Co., Ltd., Japan
[21] Appl. No.: 319,363
[22] Filed: Nov. 9, 1981
[30] Foreign Application Priority Data Nov. 11, 1980 [JP] Japan ................................. 55-157669

[51] Int. Cl.³ ............................................. B29D 27/04
[52] U.S. Cl. ...................................... 264/51; 209/509;
264/40.6; 264/236; 425/144; 425/160; 425/451;
425/817 R
[58] Field of Search .................. 264/54, 51, 236, 46.6;
425/817 C, 817 R, 160, 451, 144; 209/3.1, 509,
523, 539, 552, 599

[56] References Cited

U.S. PATENT DOCUMENTS

| | | | |
|---|---|---|---|
| 2,908,943 | 10/1959 | Miller | 264/46.6 |
| 3,124,627 | 3/1964 | Hood | 264/54 |
| 3,129,270 | 4/1964 | Hood | 264/54 |
| 3,247,295 | 4/1966 | Burwell | 264/54 |
| 3,745,314 | 7/1973 | Mathias et al. | 209/523 X |
| 3,880,586 | 4/1975 | Murayama et al. | 209/3.1 X |
| 3,939,063 | 2/1976 | Epperson et al. | 209/3.1 |
| 3,969,228 | 7/1976 | Browning | 209/523 |
| 4,011,155 | 3/1977 | Feurstein et al. | 209/3.1 |
| 4,325,688 | 4/1982 | Kumasaka et al. | 425/817 R X |
| 4,352,651 | 10/1982 | Kumasaka et al. | 425/817 R X |
| 4,387,064 | 6/1983 | Werderitch et al. | 209/509 X |

FOREIGN PATENT DOCUMENTS 56-27315 3/1981 Japan ................................. 425/817 C

OTHER PUBLICATIONS

"Whittington's Dictionary of Plastics", by Lloyd R. Whittington, Stamford, Conn., Technomic, ©1968, Preface, pp. 81, 193 and 249.
"The Condensed Chemical Dictionary", Eighth Edition, revised by Gessner G. Hawley, New York, Van Nostrand Reinhold, ©1971, pp. 332, 713.
"Hackh's Chemical Dictionary", Fourth Edition, completely revised and edited by Julius Grant, New York, McGraw-Hill, ©1972, p. 224.

Primary Examiner—Philip Anderson
Attorney, Agent, or Firm—Omri M. Behr

[57] ABSTRACT

A method for the manufacture of shaped articles of polyurethane foam, which comprises pretreating metal molds for at least two types of shaped articles of polyurethane foam conveyed on conveyor units connected to heater units, forwarding said metal molds on the conveyor units according to the types of shaped articles to be produced, adjusting temperatures of said metal molds, feeding relevant polyurethane dopes to said metal molds, conveying said metal molds containing the dopes on conveyor units into the heater unit containing hot water, and immersing said metal molds in the hot water thereby allowing the dopes to foam and set within said metal molds.

11 Claims, 7 Drawing Figures

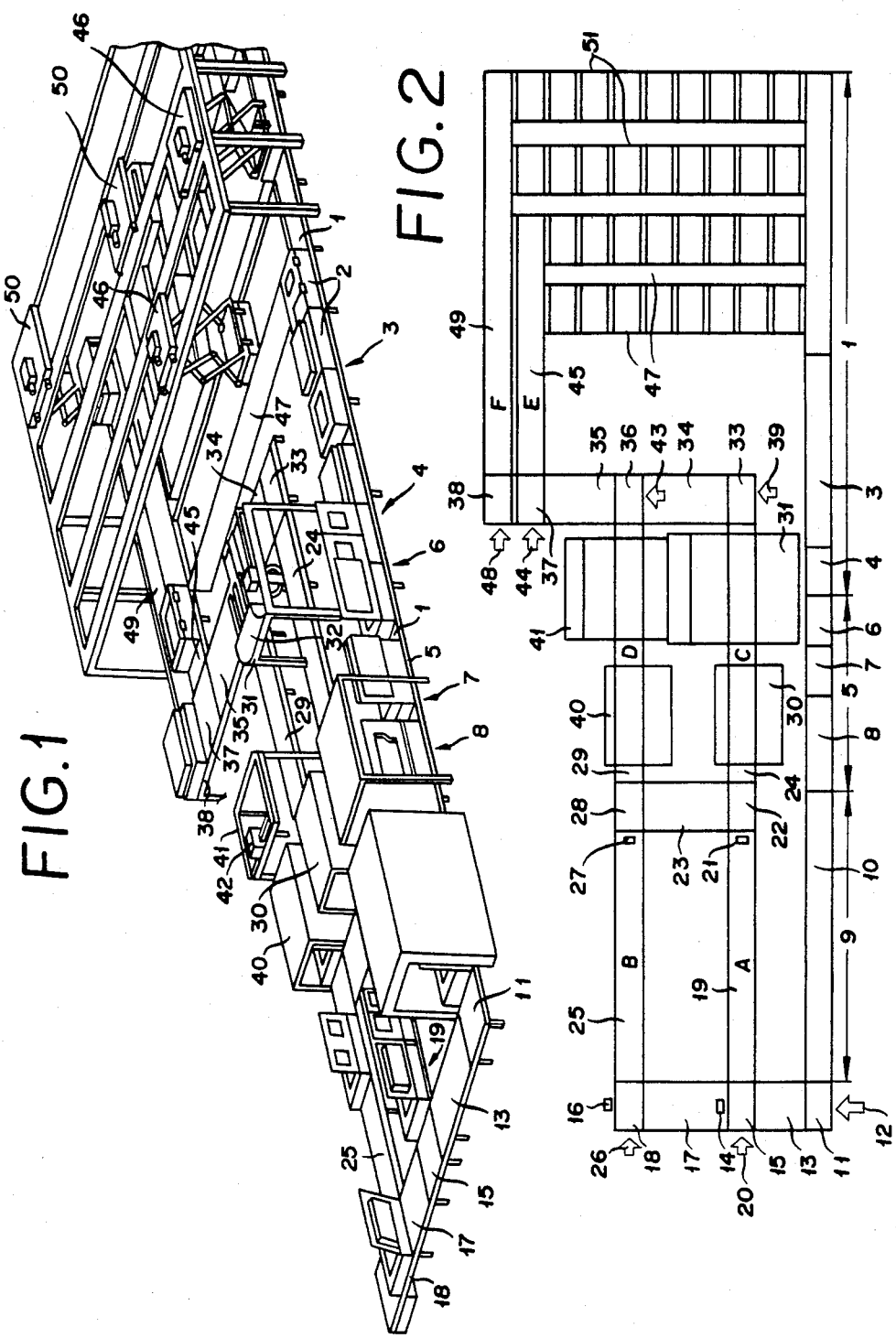

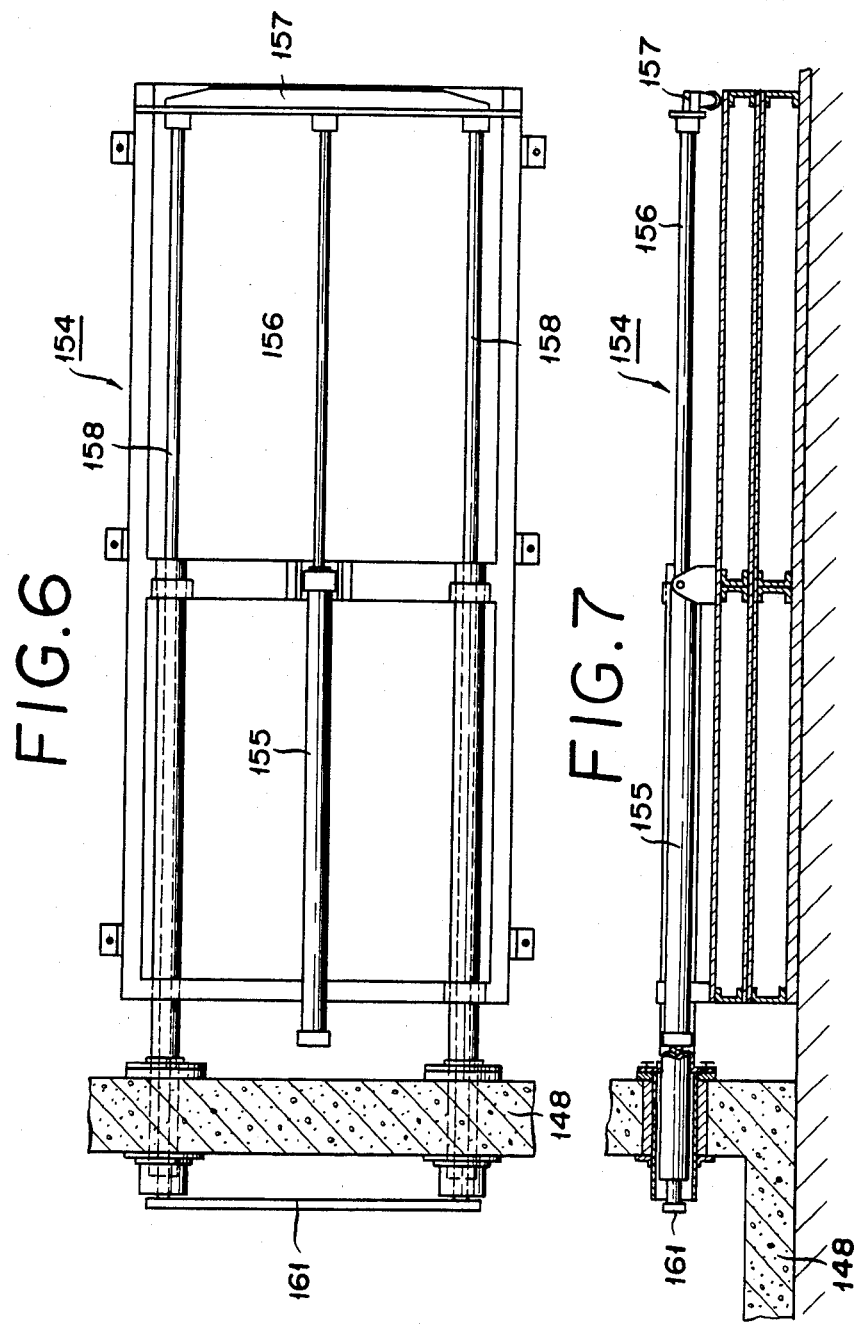

METHOD FOR MANUFACTURE OF SHAPED ARTICLE OF POLYURETHANE FOAM

BACKGROUND OF THE INVENTION

1. Fields of the Invention

This invention relates to a method and apparatus for the manufacture of shaped articles of polyurethane foam. More particularly, this invention relates to a method and apparatus for manufacturing shaped articles of polyurethane foam with higher safety and lower energy consumption.

2. Description of Prior Arts

The polyurethane foam weighs light and excels in cushioning property of flexibility. Owing to these merits, it has heretofore found extensive utility as cushioning materials in seat cushions for vehicles such as automobiles, railroad coaches and airplanes, in seat cushions for furniture such as chairs, sofas and beds, and in cushions for head rests and arm rests of automobiles. These cushions have been obtained by feeding foamable urethane resin reaction mixture to relevant metal molds and retaining these metal molds for prescribed lengths of time in heating furnaces such as hot blast stoves, electric stoves, or infrared ray stoves maintained at prescribed temperatures thereby foaming and setting the polyurethane dopes within the metal molds. In a plant engaging in the production of cushions for automobile seats, for example, the polyurethane foam cushions are required to possess different hardness and flexibility depending on the types of automobiles and the parts of seats (as between seats and back rests in chairs, for example) in which they are to be used. To satisfy the widely varying needs, therefore, the urethane reaction mixture and the molding conditions are inevitably varied with the types of automobiles and those of seats. In case where one and the same heating furnace is used for the manufacture of cushions of varying requirements, for example, the whole production cycle has to be determined on the basis of the worst of all the molding conditions involved at all.

Unfortunately, the heating furnaces of the class under consideration have a disadvantage that the temperature control is difficult, the maintenance of a constant temperature-elevation curve is difficult, the time for temperature elevation is long, and the temperature distribution is not uniform.

Provision of as many heating furnaces as the varying sets of molding conditions may be one possible solution for the difficulties. The provision of so many heating furnaces entails a huge increase of equipment cost. To overcome these drawbacks, there has been proposed a method which effects the foaming and setting of shaped articles of polyurethane foam in one heating furnace. Since this heating furnace has a small specific heat of air, it suffers from generally inferior thermal efficiency. Moreover, when several types of cushions involving different heating temperatures, heating periods, and foam-setting periods are produced by use of one and the same heating furnace, the operating conditions must be adjusted to the highest of all the foam-setting temperatures and the longest of all the foam-setting times involved. When many types of shaped articles are to be heated at once in the furnace therefore, they invariably undergo the treatment at the highest temperature for the longest period. This means that some of these types of shaped articles have to be treated at a temperature higher than and for a period longer than actually required. This method, therefore, has a disadvantage that the loss of energy amounts to a huge sum.

Further in the production of one type of shaped articles of polyurethane foam, when the aforementioned heating furnace such as, for example, a hot blast stove, an electric stove, or an infrared ray stove is used, there ensues a disadvantage that because air is used as a heat transfer medium, the thermal conduction ratio is low and the threat of fire persists, and because the working temperature is high, the energy consumption is large and the durability of molding metal dies is low.

An object of this invention, therefore, is to provide a novel method and apparatus for the manufacture of shaped articles of polyurethane foam.

Another object of this invention is to provide a method and apparatus for manufacturing shaped articles of polyurethane foam with higher safety and lower energy consumption.

A further object of this invention is to provide a method and apparatus for simultaneous manufacture of varying types of shaped articles of polyurethane foam requiring different molding conditions.

SUMMARY OF THE INVENTION

All the objects described above are fulfilled by a method for the manufacture of shaped articles of polyurethane foam, which comprises pretreating metal molds for at least two types of shaped articles of polyurethane foam brought in on conveyor units connected to heater units, forwarding the metal molds on the conveyor units according to the types of shaped articles to be produced, adjusting temperatures of the metal molds, feeding relevant urethane reaction mixture to the metal molds, conveying the metal molds containing the dopes on conveyor units into the heater unit containing hot water, and immersing the metal molds in the hot water thereby allowing the dopes to foam and set within the metal molds.

This method is worked by apparatus for the manufacture of shaped articles of polyurethane foam, which apparatus comprises in combination conveyor units connected to heater units and used for conveying metal molds, a metal mold preheating unit and a temperature adjusting unit both provided on the conveyor units mentioned above, other conveyor units disposed in at least two parallel lines and connected to the aforementioned conveyor units, a urethane reaction mixture injection unit disposed above the latter conveyor units, heater units containing hot water and connected to the former conveyor units, and units for conveying the metal molds on the conveyor units into the hot water in the heater units.

In this invention, since the heater unit uses hot water for thermal foaming of urethane reaction mixture, it enjoys an advantage that the thermal efficiency is extremely high as compared with that obtainable with the conventional heating furnace such as a hot blast stove, the threat of fire is absent and the safety of operation is secured, and owing to the relative low temperature used for the heating, the energy consumption is low and the durability of metal molds and trolleys is high.

BRIEF DESCRIPTION OF THE DRAWINGS

FIG. 1 is a perspective view of one preferred embodiment of the apparatus according to the present invention.

FIG. 2 is a layout drawing of the apparatus illustrated in FIG. 1.

FIG. 6 is a plan view of conveyor units provided within the heater unit.

FIG. 7 is a cross section taken along the line VII—VII of the diagram of FIG. 6.

PREFERRED EMBODIMENT OF THE INVENTION

Figure 3:
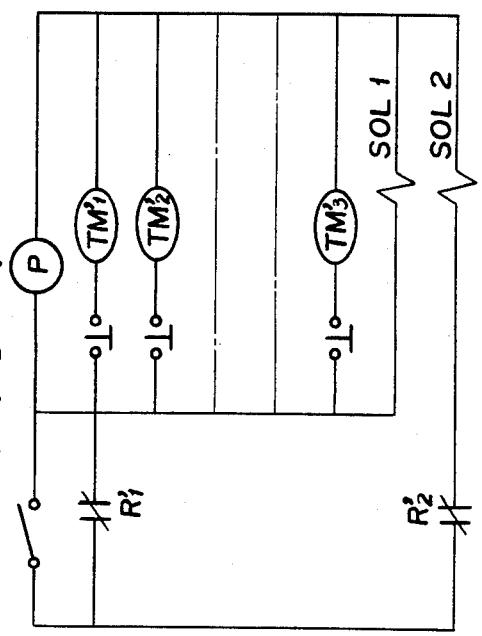
FIG. 3 and FIG. 4 are sequence diagrams illustrating the operation of heating molding metal dies in the heater unit.

Now, the present invention will be described in detail below with reference to the accompanying drawings. As illustrated in FIGS. 1-2, a metal mold 2 containing a foamed and set shaped article of polyurethane foam and conveyed from a heater unit to be described more fully later on one first conveyor unit (such as, for example, a belt conveyor, a chain conveyor, or some other similar driven conveyor) 1 is dried in a drying zone 3, then the mold 2 is opened in a die opening zone 4, and the mold 2 is forwarded on a second conveyor unit (such as, for example, an accumulate conveyor) connected to the aforementioned first conveyor unit and brought into a product removing zone 6 there to be emptied of the product. Subsequently, the mold 2 is cleaned in a cleaning zone 7 and spray coated with a mold release agent in a spray zone 8. Further, the mold 2 is subjected to temperature adjustment in a primary temperature adjusting zone 10 formed on a third conveyor unit (such as, for example, a belt conveyor, a chain conveyor, or some other similar driven conveyor) connected to the aforementioned second conveyor unit 5 and, thereafter, the mold 2 is forwarded to a first direction changer (such as, for example, a ball caster direction changer) 11. On this direction changer 11, the mold is sorted by a first sorting unit (not shown) between the type to be advanced along the line A and the type along the line B. It is then pushed forward by an air cylinder 12 and placed on a four conveyor unit (such as, for example, a free roller) connected to the aforementioned first direction changer 11. When the mold 2 happens to be of the type to be advanced along the line A, the aforementioned first sorter unit actuates a first stopper 14 interlocked thereto. Consequently, the mold 2 is brought to a stop on a second direction changer (such as, for example, a ball caster direction changer) 15 connected to the aforementioned fourth conveyor unit. When the mold 2 is of the type to be advanced along the line B, the first stopper is not actuated but a second stopper 16 alone is actuated. Consequently, the mold 2 is passed through a fifth conveyor unit (such as, for example, a blet conveyor, a chain conveyor, or some other similar driven conveyor) 17 connected to the aforementioned second direction changer and is brought to a stop on a third driection changer 18.

The line A and the line B are distinguished by the respective purposes such as, for example, those of works to be performed on the molds 2. For example, the line A is for those molds 2 using no insert. On this line A, the mold 2 is forwarded on a sixth conveyor unit [such as, for example an inclined (by means of an elevator) conveyor (free roller)] 19 connected to the aforementioned second direction changer 15 by the pressure exerted by an air cylinder 20, brought to a stop at a third stopper 21, and then moved onto a fourth direction changer 22. On the fourth direction changer, a second sorting unit (not shown) sorts the mold between the type to be advanced along the line C and the type to be advanced along the line D. After the sorting, the mold 2 is moved onto a seventh conveyor unit 23 or an eighth conveyor unit 24. In the meantime, the line B is for those molds using an insert. On this line B, the mold 2 is forwarded on a ninth conveyor unit [such as, for example, an inclined (by means of an elevator) conveyor (free roller)] 25 connected to the aforementioned third direction changer 18 by the pressure exerted by an air cylinder 26 and, during the travel on this conveyor unit, the mold 2 has a prescribed insert set in position therein, and it is brought to a stop at a fourth stopper 27 and, thereafter, moved to a fifth direction changer 28. On the fifth direction changer 28, the mold is sorted between the type to be advanced along the line C and the type to be advanced along the line D by a third sorting unit (not shown) and then moved onto the seventh conveyor unit 23 or the ninth conveyor unit 29.

The mold 2 which has been advanced to the line C is placed on the eighth conveyor unit 24 to have its temperature adjusted by a first secondary temperature adjusting unit 30. Then, the mold 2 is filled with a urethane reaction mixture of a prescribed formulation by a first injector 32 mounted freely movably on a first injector traverse unit 31. The mold 2 is then closed and conveyed toward a sixth direction changer (such as, for example, a ball caster direction changer) 33. On the sixth direction changer 33, the mold is sorted by a sorting unit (not shown) between the type to be advanced along the line E and the type to be advanced along the line F. After the sorting, the mold 2 is forwarded by the pressure exerted by an air cylinder 39 through a 10th conveyor unit 34 and an 11th conveyor 35 (each a variable speed conveyor, for example) to an eighth direction changer 37 or a ninth direction changer 38 (each a ball caster direction changer, for example).

The mold 2 which has been advanced to the line D, during the travel on the ninth conveyor unit 29, has its temperature adjusted to a prescribed level by a second secondary temperature adjusting unit 40. Then by a second injector 42 mounted freely movably on a second injector traverse unit 41, the mold 2 is filled with a ureathane reaction mixture of a prescribed formulation. The mold 2 is then closed and forwarded to a seventh direction changer (such as, for example, a ball caster direction changer) 36. On the seventh direction changer 36, the mold is sorted by a sorting unit (not shown) between the type to be advanced along the line E and the type to be advanced along the line F. Then, by the pressure exerted by an air cylinder 43, the mold 2 is forwarded through the 11th conveyor unit 35 to an eighth direction changer 37 or a ninth direction changer 38.

The mold 2 on the eighth direction changer 37 is forwarded by the pressure exerted by an air cylinder 44 along a 12th conveyor unit (such as, for example, a belt conveyor, a chain conveyor, or some other similar driven conveyor) 45, then conveyed by a first mold traverse unit 46, and immersed into a heating liquid medium such as hot water or hot oil contained within a heater unit 47 of heating medium direct immersion type. While the mold remains immersed in the heating liquid medium, the polyurethane dope held within the mold is foamed and set. The first mold traverse unit 46 serves to convey one mold after another brought in by the 12th conveyor unit 45 and imxerse them one by one into the heating liquid medium within the heater unit 47. The mold 2 which has remained immersed in the heating liquid medium for a prescribed length of time is pulled out of the medium by the first mold traverse unit 46, set on the first conveyor unit 1, and forwarded. In this case, at the time that the mold 2 is about to enter the heater unit 47, the sensor connected to a computer (not shown) sets the retention time of this particular mold in the medium. This relationship may be depicted by a sequence diagram as shown in FIG. 3. The timers $TM_1$, $TM_2, \ldots, TM_n$ are set for different types of mold. When the mold 2 passes the sensor, the particular timer corresponding to the type of the mold 2 is cut and, consequently the relay $R_2$ is actuated, with the result that the mold is picked up by the first mold traverse unit 46 and forwarded. So long as the heater unit 47 has room, the relay $R_1$ is given a command to continue the introduction of next molds into the heater unit 47.

Figure 4:
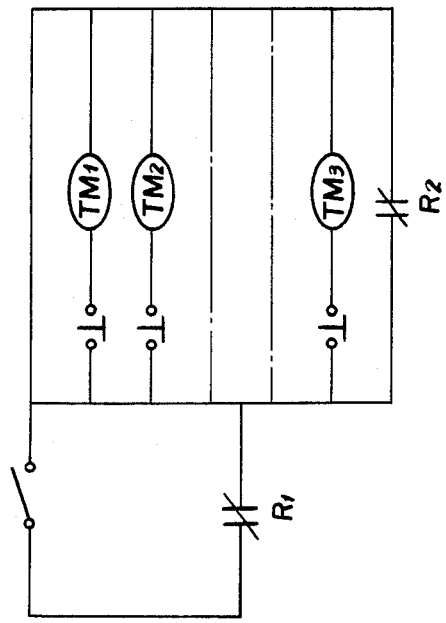

The mold on the ninth direction changer 38 is forwarded by the pressure of an air cylinder 48 on a 13th conveyor unit (such as, for example, a belt conveyor, a chain conveyor, or some other similar driven conveyor) 49. Then, it is conveyed by a second mold traverse unit 50 to a jacket type heater unit 51, and connected to a steam feed inlet (Not shown). Subsequently, the valve is opened to start feeding steam of a prescribed pressure. Consequently, the urethane reaction mixture in the mold is foamed and set. The second mold traverse unit 50 serves to convey one mold after another brought in by the 13th conveyor unit 49 and connect them to the steam feed inlet of the heater unit 51. The mold 2 which has been steam for a prescribed period is lifted up by the second mold traverse unit 50, set on the first conveyor unit 1, and forwarded. In this case, before the mold 2 reaches the heater unit 51, the sensor connected to the computer (not shown) sets the duration in which the mold is to receive the supply of steam. This relationship may be depicted by a sequence diagram as shown in FIG. 4. The timers $TM_1', TM_2' \ldots, Tm_n'$ are set for different types of molds. When the mold 2 passes the sensor, the particular timer corresponding to the type of the mold 2 is cut and, consequently, the solenoid SOL2 is actuated, with the result that the valve is closed and the mold is picked up by the second mold traverse unit 50. When the heater unit 51 is filled up to capacity and has no more room, the relay $R_2'$ issues a command to suspend the supply of molds temporarily.

When the heater unit used for the mold is of a jacket type as in the preferred embodiment described above, all the molds or at least the part of them to be treated by the jacket type heater unit are desired to be provided with a hole for admitting the steam into the die interiors.

So far, the heater units involving different heating conditions have been described mainly with reference to the combination of a heating medium direct immersion type heater unit and a jacket type heater unit. Optionally, either of the two heater units described above may be replaced with a shower type heater unit. Otherwise, all the three types of heater units may be combined when necessary. Of course, a plurality of heater units of one and the same type may be used by suitably varying their operating such as, for example, heating temperatures.

Figure 5:
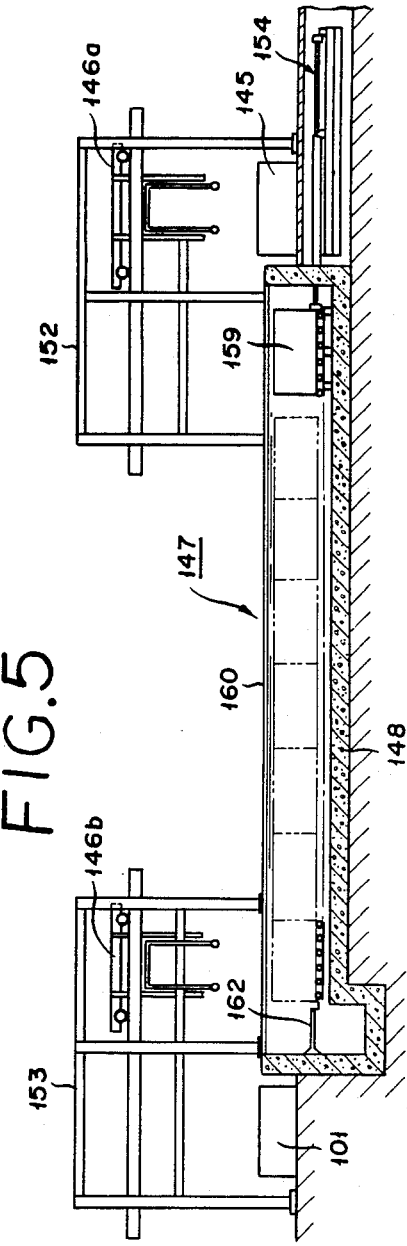
FIG. 5 is a cross section of another preferred embodiment of the heater unit in the apparatus of the present invention.

FIGS. 5-7 illustrate other embodiments of the present invention. They are typical heater units to be used in the apparatus of FIGS. 1-2. Now, the embodiment having a heater unit 147 installed in one line as illustrated in FIG. 5 will be described. The inlet side end of the hot water bath 148 is connected to a 12th conveyor unit 145 and the outlet side end thereof is connected to a first conveyor unit 101. The first and 12 conveyor units 101, 145 are each a belt conveyor, a chain conveyor, or some other similar driven conveyor. Their terminals are each joined to one end of the aforementioned hot water bath 148. Above the terminals, a mold lift 146a is fastened to a rack 152. Similarly above the starting point of the first conveyor unit 101, a mold lift 146b is fastened to a rack 153. At one end (inlet side end) of the hot water bath 147, a mold conveyor unit 154 is disposed below the 12th conveyor unit 145. The mold conveyor unit 154 has one ends of protruding rods 158, 158 fastened to a bar 157 fixed to the leading end of a rod 156 of a hydraulic cylinder 155 such as an air cylinder or hydraulic cylinder as illustrated in FIG. 6 and FIG. 7. The other ends of these protruding rods 158, 158 are thrust out to be freely slided on the end walls of the hot water bath 154. A cover 161 is also attached. The hot water bath 154 is provided at the outlet end side with a stopper 162 adapted to fix the position of the mold 152.

This hot water bath 148 is filled to capacity with hot water. The mold 159 which has been brought in on the 12th conveyor unit 145 is lifted up by the mold lift 146a, conveyed over the hot water bath 148, and then plunged into the hot water 160 held in the hot water bath 148. After releasing the mold 159, the mold lift 146a returns to its original position. Then, the hydraulic cylinder 155 of the mold conveyor unit 154 is actuated and, consequently, the rods 156 are moved and contracted toward the cylinder 155. The protruding rods 158, 158 are moved in conjunction with the bar 157 toward the hot water bath 148. Thus, they slide over the end walls of the hot water bath and move the bar 161. As the result, the mold 159 inside the hot water bath 148 is moved in the direction of the outlet side end. When the rod 156 is subsequently extended, the bar 161 is retracted to give rise to an empty space between the end part of the aforementioned mold 159 and the bar 161. At the time that the bar 161 is retracted, the mold 159 which has been brought in by the 12th conveyor unit 145 is lifted by the action of the mold lift 146a, moved toward the hot water bath 148 side, then lowered into the aforementioned empty space, and finally immersed in the hot water 160. The stroke of the rod 156 of the hydraulic cylinder 155, therefore, is required to be at least equal to or preferably greater than the length of the mold 159 in use. By the repetition of the procedure described above, one mold 159 after another is moved by the pressure to the outlet side end of the hot water bath 148 and brought to a stop by the stopper 162. In this while, the foamable urethane resin reaction mixture contained within the mold is foamed and set by the heat applied thereto. When the mold 159 collides with the stopper 162, the limit switch (not shown) is actuated and, consequently, the mold lift 146 moves downwardly toward the mold 159, lifts up the mold 159, moves it onto the first conveyor unit 101, lowers it and sets it on the first conveyor unit 101.

The embodiment which uses the hot water bath 148 in one line has been described. Optionally, a plurality of hot water baths may be used in as many parallel lines. Otherwise, a 13th conveyor unit (not shown) may be installed and hot water baths operated under similar or different conditions may be installed in one line in much the same way as in the apparatus of FIGS. 1-2. By this arrangement, a plurality of foamable urethane resin reaction mixtures having different foaming conditions may be foamed and set to produce shaped articles of different types.

In the present invention, since the heating of the foamable urethane resin reaction mixture in the molds is effected in hot water, the molds must be sealed liquid-tightly.

Now, the present invention will be described more specifically below with reference to a working example. Whereever parts are mentioned in the working example, they are meant as parts by weight unless otherwise specified. Example Apparatus illustrated in FIGS. 1–2 provided with the heater unit of FIGS. 5–7 was used to produce seat cushions for automobiles by the following method.

The molds 2 conveyed by the first conveyor unit 1 from the heater unit 147 were dried in the drying zone 3, then opened in the die opening zone 4, and placed in the product removing zone 6 of the second conveyor unit 5 to be emptied of the products. The empty molds were cleaned in the cleaning zone 77 and then spray coated with a mold release agent in the spraying zone 8. In the first temperature adjusting zone 10 formed on the third conveyor unit 9, the molds had their temperature adjusted to 35° C. ±5° C., and then they were forwarded to the first direction changer 11. On this direction changer 11, the molds were sorted by the first sorting unit between the type to be advanced along the line A and the type to be advanced along the line B. By the pressure exerted by the air cylinder 12, the molds were forwarded on the fourth conveyor unit 13. The molds used in this case had an inner volume of 13 liters and were made of aluminum alloy. By the action of the first stopper 14 interlocked to the aforementioned first sorting unit, those molds to be forwarded along the line A were brought to a stop one by one on the second direction changer 15. In the case of molds to be advanced along the line B, since the first stopper 14 was not actuated and the second stopper 16 alone was actuated, the molds were forwarded through the fifth conveyor unit 17 and brought to a stop one by one at the third direction changer 18.

The molds which had been conveyed on the sixth conveyor unit 19 by the pressure of the air cylinder 20 stopped by the third stopper 21, and then moved to the eighth conveyor unit 24 had their temperature adjusted to 40° C. ±2° C. They were then filled with a foamable urethane resin reaction mixture comprising 100 parts of polypropylene glycol (molding grade polypropylene glycol having a hydroxyl number 54, made by Sanyo Chemical Co., Ltd., and marketed under trademark designation of FA-709), 0.5 part of silicone (made by Nihon Unicar Co., Ltd. and marketed under trademark designation of L540), 3.5 parts of water, 0.1 part of stannous octoate, 0.1 part of triethylenediamine, 0.1 part of N methyl morpholine, 5.0 parts of Freon (made by Daikin Co., Ltd., and marketed under trademark designation of R-12), and 48 parts of tolylene diisocyanate (80/20). The molds were closed and sealed with aluminum putty (a mixture of 80% of aluminum and 20% of resin, made by Nihon Devcon Co., Ltd., and marketed under trademark designation of DEVCON F).

Into the molds which had been conveyed on the ninth conveyor unit 25 by the pressure of the air cylinder 26, insert members such as leaf springs were inserted. Then, the molds were moved to the ninth conveyor unit 29, where they had their temperature adjusted to 40° C.±2° C. by the second secondary temperature adjuster 40. Thereafter, the molds were filled with a foamble urethane resin reaction mixture comprising 60 parts of polypropylene glycol (molding grade polypropylene glycol made by Sanyo Chemical Co., Ltd., and marketed under trademark designation of FA702), 40 parts of polypropylene glycol (polyxer polyol polypropylene glycol made by Sanyo Chemical Co., Ltd., and marketed under trademark designation of FA720), 0.3 part of trimethylenediamine, 0.2 part of triethylenediamine, 2.5 parts of water, 2.0 parts of silicone (made by Nihon Unicar Co., Ltd., and marketed under trademark designation of 1530), and 30 parts of isocyanate (tolylene diisocyanate/4,4'-diphenylmethane diisocyanate=80/20). The molds were closed and sealed with aluminum putty (a paste comprising 80% aluminum powder and 20% proprietory resin sold by Nihon Devcon Co., Ltd., under the mark Devcon F).

The molds for the line A and the line B were forwarded through the 10th and 11th conveyor units 34, 35 respectively to the eighth direction changer 37 and the ninth direction changer 38. The molds set one by one on the eighth direction changer 37 were forwarded by the pressure of the air cylinder along the 12th conveyor unit 45 to the inlet side end of the heater unit 147. These molds were picked up by the mold lift 146a and immersed in the hot water 160 held within the hot water bath 148. Within the bath, these molds were moved by the hydraulic cylinder 155 while being heated by the hot water. When the molds reached the stopper 162, the limit switch is actuated. Consequently, the molds were picked up by the mold lift 146b and set on the first conveyor unit 1. At this time, the temperature of the hot water was 92° C. and the retention time of the molds in hot water was 6 minutes. Similarly, the molds for the line B were forwarded along the 13th conveyor unit 49 to the other heater unit 147, and immersed in hot water at 85° C. for three minutes to be foamed.

As described above, the present invention contemplates a method for the manufacture of shaped articles of polyurethane foam, which comprises pretreating metal molds for at least two types of shaped articles of polyurethane foam conveyed on conveyor units conected to heater units, forwarding the metal molds on the conveyor units according to the types of shaped articles to be produced, adjusting temperatures of the metal molds, feeding appropriate urethane mixture to the metal molds, conveying the metal molds containing the foamable urethane resin reaction mixture on conveyor units into the heater unit containing hot water, are immersing the metal molds in the hot water thereby allowing the foamable urethane resin mixtures to foam and set within the metal molds. Compared with the conventional heating furnace method, the method of this invention enjoys an advantage that the thermal efficiency is extremely high, the threat of fire is absent and the safety of operation is ensured, and, because of a relatively low heating temperature, the energy consumption is low, and the durability of molds and trolleys used in the apparatus is long. Further since, one apparatus can be effectively used to produce a plurality of types of shaped articles of polyurethane foam having different foaming conditions, the method has a further advantage that the cost of production is low.

What is claimed is:

1. A method for the substantially concurrent manufacture of at least a first and a second type of shaped article of polyurethane foam in molds of a first and a second group, said first group of molds being adapted to the formation of said first type of shaped article and second type of molds being adapted to the formation of said second type of shaped article, said first type of foamed shaped article having predetermined physical properties different from the said second type of foamed shaped article, comprising the sequential steps of providing a plurality of molds of said first and said second groups, providing a primary temperature adjustment to all of said molds, selecting and then separating molds of said first group from molds of said second group and causing the molds of said first group to be conveyed along at least one predetermined path and the molds of the second group to be conveyed along at least one other predetermined path, providing an appropriate secondary temperature adjustment to the molds of said first group and to molds of said second group on their appropriate paths injecting the appropriate foamable urethane resin reaction mixture to the molds of said first group and the molds of second group providing a first series of heater units, each comprising a water containing bath and heating means therefor to maintain said bath at a first predetermined temperature conveying molds of said first group to said first heater units and immersing said molds in heated water baths thereof providing a second series of heater units each comprising a water containing bath and a heating means therefor to maintain said bath at a second predetermined temperature conveying molds of said second group to said second heater units and immersing said molds in the heater water baths thereof whereby the urethane resin mixtures in said molds is permitted to foam and set within said molds.

2. A method in accordance with claim 1 comprising providing the water temperature in said first heater units to be different from the water temperatue in said second units.

3. A method in accordance with claim 1 wherein the immersion time of said first group of molds is different from the immersion time of said second group of molds.

4. A method in accordance with claim 2 wherein the immersion time of said first group of molds is different from the immersion time of said second group of molds.

5. An apparatus for the substantially concurrent manufacture of at least a first and a second type of shaped articles of polyurethane foam in a first and a second group of metal molds respectively comprising a first conveying means for the conveyance of a succession of metal molds of both groups, means for providing a primary adjustment of the temperature of all of said molds on said first conveying means, means for selecting then separating molds of at least said first group from molds of from at least said second group delivered thereto by said first conveying means, at least two second conveying means located adjacent to said separating means, at least one of said second conveying means being adapted to the conveyance of molds of said first group and at least the other of said second conveying means being adapted to conveyance of molds of said second group, means for providing an appropriate secondary temperature adjustment to molds of said first group and molds of said second group on their appropriate second conveying means, means for injecting the appropriate foamable urethane resin reaction mixture into said molds, at least two third conveying means for conveying said charged molds to the appropriate at least two fourth conveying means, at least one of said third and said fourth conveying means being adapted to receive molds of said first group and at least one of said third and said fourth conveying means being adapted to receive molds of said second group, at least two groups of mold heater units each unit comprising a water containing bath an means for maintaining said water at an appropriate temperature, said heater units being located proximate to the respective fourth conveyor means, one group of said heater units being adapted to receive charged molds of said first group and one of said groups of heater units being adapted to receive molds of said second group, and transfer means to transfer molds from the appropriate fourth conveying means to the appropriate heater units.

6. An apparatus in accordance with claim 5 additionally comprising means for maintaining different water temperatures in the heater units.

7. An apparatus in accordance with claim 6 further comprising means for maintaining different durations of immersion of the metal molds in the said hot water baths.

8. An apparatus in accordance with claim 5 wherein the units for transferring metal molds into the hot water heater units are transfer units disposed over said heater units.

9. An apparatus according to claim 5 wherein the units for transferring metal molds into the hot water in the heater unit are metal mold lifts disposed near the inlet side end and the outlet side end of said heater units.

10. An apparatus in accordance with claim 9 wherein the heater units are provided on the inlet sides ends thereof with a unit for moving metal molds in the direction of the oulet side ends thereof.

11. An apparatus in accordance with claim 10 wherein the unit for moving metal molds within the heater units from the inlet end sides to the outlet end sides comprising a hydraulic cylinder disposed outside the inlet side wall of the heater unit and protruding rods connected to said cylinder and adapted to be freely slid on said side wall.

* * * * *